US012128421B2

(12) United States Patent
Narayanaswamy et al.

(10) Patent No.: US 12,128,421 B2
(45) Date of Patent: Oct. 29, 2024

(54) MANOUEVERABLE CRUSHING AND SCREENING SYSTEM

(71) Applicant: TEREX INDIA PRIVATE LIMITED, Tamil Nadu (IN)

(72) Inventors: Santhanam Narayanaswamy, Tamil Nadu (IN); Jayapal Dhanesh, Tamil Nadu (IN)

(73) Assignee: TEREX INDIA PRIVATE LIMITED, Tamil Nadu (IN)

( * ) Notice: Subject to any disclaimer, the term of this patent is extended or adjusted under 35 U.S.C. 154(b) by 792 days.

(21) Appl. No.: 17/262,382

(22) PCT Filed: Jul. 24, 2019

(86) PCT No.: PCT/IB2019/056321
§ 371 (c)(1),
(2) Date: Jan. 22, 2021

(87) PCT Pub. No.: WO2020/021467
PCT Pub. Date: Jan. 30, 2020

(65) Prior Publication Data

US 2021/0299674 A1 Sep. 30, 2021

(30) Foreign Application Priority Data

Jul. 24, 2018 (IN) ............................ 201841027700

(51) Int. Cl.
*B02C 23/10* (2006.01)
*B02C 21/02* (2006.01)
*B07B 1/00* (2006.01)

(52) U.S. Cl.
CPC ............ *B02C 23/10* (2013.01); *B02C 21/026* (2013.01); *B07B 1/005* (2013.01)

(58) Field of Classification Search
CPC ....... B02C 23/10; B02C 21/026; B02C 21/02; B02C 2013/28636; B02C 2013/28645; B07B 1/005
See application file for complete search history.

(56) References Cited

U.S. PATENT DOCUMENTS 2,050,458 A * 8/1936 Ovestrud ................ B02C 23/00 241/101.76
4,383,651 A * 5/1983 Couperus ................ B07B 1/005 241/101.76
4,598,875 A * 7/1986 Bronson ................. B02C 23/12 241/101.76

FOREIGN PATENT DOCUMENTS

JP H1147627 A 2/1999

OTHER PUBLICATIONS

International Search Report and Written Opinion of the International Searching Authority, issued in PCT/IB2019/056321, mailed May 12, 2019; ISA/EP.

* cited by examiner

*Primary Examiner* — Mohammed S. Alawadi
(74) *Attorney, Agent, or Firm* — Harness, Dickey & Pierce, P.L.C.

(57) ABSTRACT

A manoueverable crushing and screening system (50) is disclosed. The manoueverable crushing and screening system (50) comprises of a chassis (52) with a manoueverable undercarriage (58). The system (50) also comprises of a crushing unit (53) mounted at one end of the chassis (52) and a screening unit (51) that is mounted on the other end of the chassis (52). A steep angle conveyor (55) is configured between the crushing unit (53) and the screening unit (51) and the steep angle conveyor (55) is operable between a first position (A) and a second position (B). In the first position (A), the steep angle conveyor (55) conveys crushed material (Continued)

from the crushing unit (53) to the screening unit (51). This configuration of the system reduces operating length of equipment and also reduces length of the plant.

6 Claims, 6 Drawing Sheets

MANOUEVERABLE CRUSHING AND SCREENING SYSTEM

CROSS-REFERENCE TO RELATED APPLICATIONS

This application is a 371 U.S. National Phase of International Application No. PCT/IB2019/056321, filed Jul. 24, 2019, which claims priority to Indian patent application Ser. No. 201841027700, filed Jul. 24, 2018. The entire disclosures of the above applications are incorporated herein by reference.

FIELD OF THE INVENTION

Present disclosure relates in general to a field of quarries and mining. Particularly, but not exclusively, the present disclosure relates to a crusher system used in quarries and mining. Further, embodiments of the disclosure disclose a manoueverable crusher system with steep angle conveyor which enables the easy transportation and deployment of the manoueverable crusher system in a confined space.

BACKGROUND OF THE INVENTION

Quarrying and mining relate to the aspect of removing rock, sand, gravel or other minerals from the ground. Quarries and mines are also used to excavate minerals, ore, precious stones etc. The materials excavated by quarrying are further processed for providing construction materials to build roads and buildings, delivering vital minerals to agriculture, supporting the generation of electricity etc.

The materials excavated from quarries and mines are processed by using crushing and screening technologies. The excavated materials are initially crushed to smaller sized particles by means of a crusher. The crushed particles are further segregated based on their size in a screening unit. Conventionally, the crushing and screening units are usually setup near the quarries or the mines. The excavated materials are then directed to these crushing and screening units for processing. Such a technique involves assembling of the crushing and screening units near the quarries/mines, and such process is time consuming and a complex in nature. Further, after the minerals and stones in the quarries/mines have been exhausted due to excavation, the crushing and screening units have to be disassembled and transported to the next location. This process is time consuming and expensive.

With advancements in the technology, a manoueverable processing plants have been developed and being used in quarries and mining applications for the crushing and the segregation of crushed particles. The manoueverable processing plant consists of crushing and screening units which may be driven by either hydraulic or electric power. The crushing and screening units are mounted on a chassis with an undercarriage. The processing plant may be capable of being moved to different locations by means of the manoueverable undercarriage. Thus, the manoueverable processing plant can be moved or shipped to different quarries/mines without being disassembled and consequently is less expensive compared to the traditional crushing and screening plants. The chassis of the manoueverable processing plant houses a crushing unit and a screening unit with a conveyor configured between the crushing and screening unit. The conveyor transfers the crushed material from the crusher unit to the screening unit.

Most of the manoueverable screening plants that are currently being used, make use of a screen with two or three decks. Manoueverable screening plants which utilize a screen with two decks, are capable of segregating crusher material into products of three different sizes. When a two-deck screen is used in manoueverable crushing and screening plant, the different size of product that can be segregated from screen is limited to three sizes of particles. Further, when a three-deck screen is used in conventional manoueverable material processing plant, the primary discharge conveyor which conveys material form the crushing unit to the screening unit, has a constraint in discharging material at an elevated angle. The maximum allowable discharge angle of plain belt conveyor may be up to 30°, due to which the length of surface relating to the lift and conveying angle on the manoueverable crushing and screening plant increases drastically. Since the plain belt conveyor is disposed at a lower angle, the overall length of the plain belt conveyor is increased, and the crawler undercarriage length is also consequently increased. Thus, the overall length of the plant is increased which affects the manoeuvrability of the plant and contributes to an increase in the machine weight.

Further, some manoueverable application utilize crusher with three deck screens. For example, U.S. Pat. No. 4,383,651 (issued to Egbert Couperus, Belleville, Canada, on May 17, 1983) utilizes a three-deck screen where the material on the first deck of the screen is fed directly to the crusher due to space constrains. Therefore, the advantage of taking four product size from a three-deck screen is not utilised.

The present disclosure is directed to overcome one or more limitations stated above or any other limitations associated with prior arts.

SUMMARY OF THE INVENTION

One or more shortcomings of the conventional manoueverable processing plants are overcome and additional advantages are provided through the provision of the crusher system with steep angle conveyor as claimed in the present disclosure.

Additional features and advantages are realized through the techniques of the present disclosure. Other embodiments and aspects of the disclosure are described in detail herein and are considered a part of the claimed disclosure.

In one non-limiting embodiment of the disclosure a manoueverable crushing and screening system is disclosed. The manoueverable crusher system includes a chassis with a manoueverable undercarriage. The system also comprises of a crushing unit that is mounted at one end of the chassis and a screening unit that is mounted on the other end of the chassis. Further, a steep angle conveyor is configured between the crushing unit and the screening unit. The steep angle conveyor is operable between a first position and a second position. When the steep angle conveyor is in the first position, it transports the crushed material from the crushing unit to the screening unit.

In an embodiment of the disclosure, the manoueverable undercarriage is at least one of a tracked under carriage or a wheeled undercarriage.

In an embodiment of the disclosure, when the steep angle conveyor is operated to a second position, the steep angle conveyor is lowered and supported at a substantially same level as that of the crushing unit.

In an embodiment of the disclosure, the steep angle conveyor is a pocket conveyor.

In an embodiment of the disclosure, the steep angle conveyor includes a loading section that is fixed to the chassis, a head section that is mounted on the articulation unit and a steep angle conveyor belt that extends between the loading section and the head section. The steep angle conveyor belt includes a plurality of pockets for conveying the crushed material.

In an embodiment of the disclosure, the head section of the steep angle conveyor is provided with a driving unit which drives the steep angle conveyor belt by rotating a drive drum.

In an embodiment of the disclosure, the articulation unit comprises of an actuator coupled to the head section. The actuator is configured to operate the steep angle conveyor between the first position and the second position. Further, a guide channel is defined in the chassis which supports and guides the movement of the head section between a working position and a resting position.

In an embodiment of the disclosure, the screening unit comprises a plurality of decks to segregate the crushed material.

In an embodiment of the disclosure, the manoueverable crushing and screening system is provided with a plurality of secondary conveyors. Each of the plurality of secondary conveyors is coupled to an outlet of at least one of the plurality of decks.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristics of the disclosure are set forth in the appended claims. The disclosure itself, however, as well as a preferred mode of use, further advantages, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
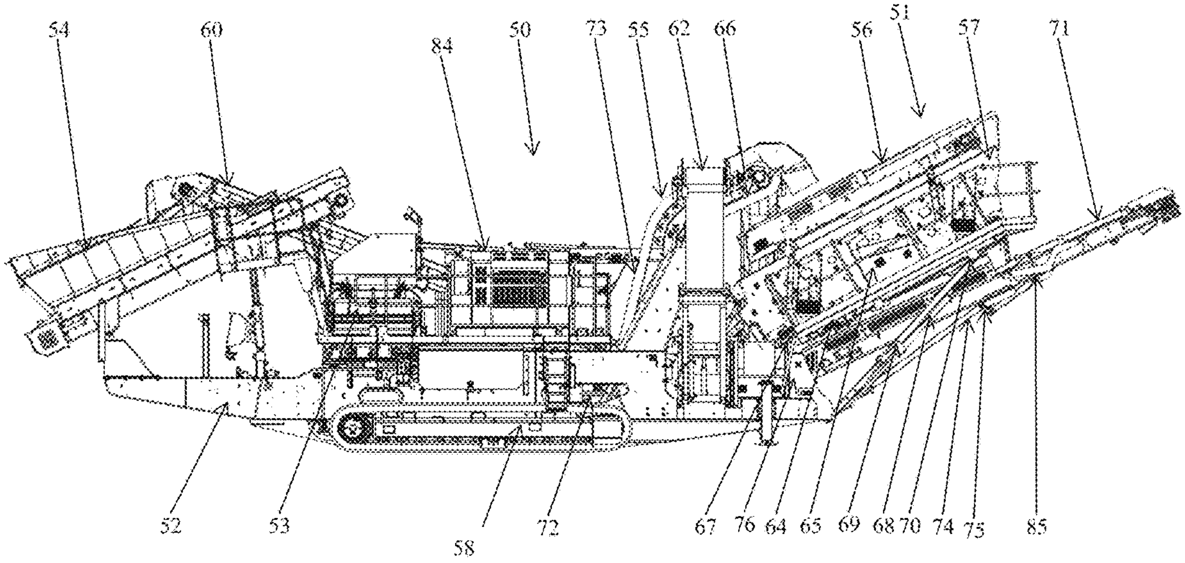
FIG. 1 illustrates a side view of the manoueverable crushing and screening system, in accordance with an embodiment of the present disclosure.

The figure depicts embodiments of the disclosure for purposes of illustration only. One skilled in the art will readily recognize from the following description that alternative embodiments of the manoueverable crushing and screening system illustrated herein may be employed without departing from the principles of the disclosure described herein.

DETAILED DESCRIPTION

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiment disclosed may be readily utilized as a basis for modifying or designing other devices for carrying out the same purposes of the present disclosure. It should also be realized by those skilled in the art that such equivalent constructions do not depart from the spirit and scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a system that comprises a list of components does not include only those components but may include other components not expressly listed or inherent to such mechanism. In other words, one or more elements in the device or mechanism proceeded by "comprises . . . a" does not, without more constraints, preclude the existence of other elements or additional elements in the mechanism.

Embodiment of the present disclosure discloses a manoueverable crushing and screening system. Conventionally, manoueverable screening plants use a screen with two decks. When a two-deck screen is used in manoueverable crushing and screening system, the different size of product that can be segregated from the screen is limited to three sizes of particles. Further, when a three-deck screen is used in conventional manoueverable material processing system, the primary discharge conveyor which conveys material form the crushing unit to the screening unit, has a constraint in discharging material at an elevated angle. The maximum allowable discharge angle of plain belt conveyor is 30°, due to which the length of surface relating to the lift and conveying angle of the plain belt conveyor increases drastically. The increase in length of the plain belt conveyor results in an increase in length of the crawler undercarriage. Consequently, the overall length of the plant is also increased which affects the manoueverability and contributes to an increase in the machine weight.

Accordingly, the present disclosure discloses a manoueverable crushing and screening system. The manoueverable crushing and screening system comprises of a chassis with a manoueverable undercarriage. The system also comprises of a crushing unit that is mounted at one end of the chassis and a screening unit that is mounted on the other end of the chassis. In an embodiment, the screening unit may be at an elevated position with respect to the crushing unit. Further, a steep angle conveyor is configured between the crushing unit and the screening unit and the steep angle conveyor is operable between a first position and a second position. When operated in the first position, the steep angle conveyor is configured to convey crushed material from the crushing unit to the screening unit and at the second position, the steep angle conveyor is lowered. This configuration of the crusher system reduces the total length of the crawler undercarriage also improves maneuverability and aids in reduction of complexity and weight of the system.

The following paragraphs describe the present disclosure with reference to FIGS. 1 to 6.

Figure 2:
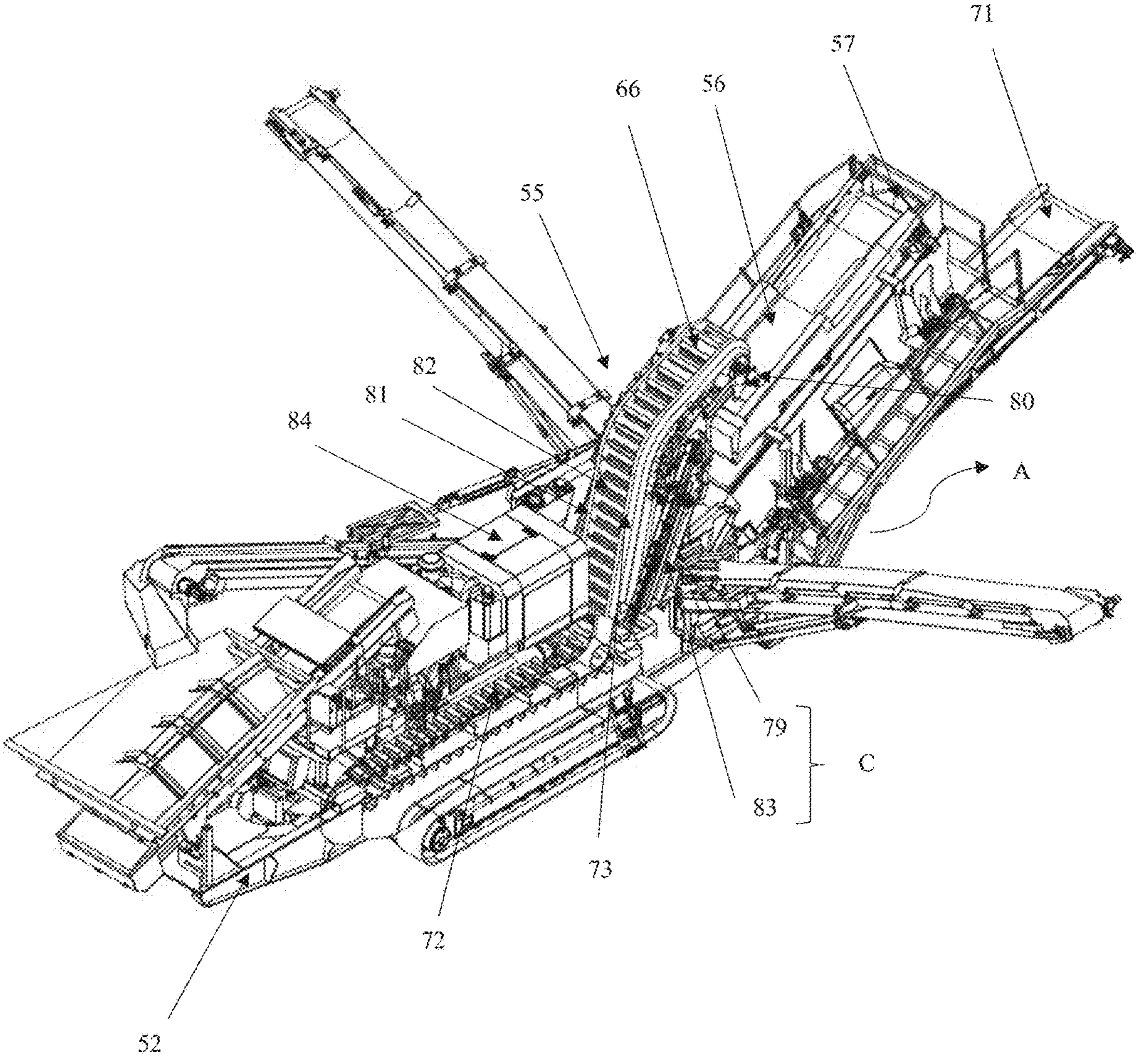
FIG. 2 illustrates the perspective view of the manoueverable crushing and screening system of FIG. 1, with the steep angle conveyor in the first position.

FIG. 1 illustrates a side view of the manoueverable crushing and screening system (50). As seen in FIG. 1, the manoueverable crushing and screening system (50) comprises of a chassis (52) with an undercarriage (58). The chassis (52) is supported by the under carriage (58) and a power unit (84) is provided on the chassis (52), which enables manoueverable crushing and screening system (50) to be moved around in a quarry. Further, a crushing unit (53), feed conveyor and a hopper (54) are housed at one end of the chassis (52), and a screening unit (51) is housed at the opposite end of the crushing unit (53). The hopper and the feed conveyor (54) are used for feeding materials that are to be crushed into the crushing unit (53). As seen in FIG. 2, the crushed material from the crushing unit (53) is further directed on to a steep angle conveyor (55). The material from the steep angle conveyor (55) is conveyed to the screening unit (51) through the plain belt transfer conveyor (56).

In an embodiment of the disclosure, the undercarriage of the manoueverable crushing and screening system (50) may be a tracked undercarriage as seen in FIG. 1 or a wheeled undercarriage may be used.

FIG. 2 illustrates the perspective view of the manoueverable crushing and screening system (50) with a steep angle conveyor (55) in the first position (A). As seen in FIG. 2, the steep angle conveyor (55) comprises of a loading section (72), an inclined section (73) and a head section (66). The loading section (72) of the steep angle conveyor (55) is fixed to the chassis (52). Further, the steep angle conveyor (55) is provided with an articulation unit (C) that is mounted to the chassis (52). The articulation unit (C) may be positioned on the chassis (52) such that, one end of the articulation unit (C) is positioned adjacent to the crushing unit (53) and an opposite end of the articulation unit (C) is positioned adjacent to the screening unit (51). The articulation unit (C) comprises of at least one actuator (83) and at least one guide rail (79) defined in the chassis.

In an embodiment, the actuator (83) may be at least one of hydraulic actuator, pneumatic actuator and the like.

In an embodiment, the guide rail is defined as a parallel spaced apart plate [not shown] mounted on the chassis to support the head section (66). The head section is provided with rollers which enable the movement of the head section between the working and the resting position (A and B) through the guide rails (79).

As seen in FIG. 2, the steep angle conveyor belt (81) that is supported by a plurality of rollers [not shown] is defined as the inclined section (73). The height of the inclined section (73) is adjusted by the actuator (83). Further, the rails (79) along with rollers are used to guide the steep angle conveyor (55) in a defined orientation when the height of the steep angle conveyor (55) is being adjusted. The steep angle conveyor (55) can turn through any angle up to a vertical line and back to the horizontal, with the ability to convey material at angles up to 90°. The height of the inclined section (73) is adjusted to be increased during the working position (A) and is lowered during transport position (B). Thus, the articulation unit (C), enables the height of the steep angle conveyor to be adjusted between the working position (A) and the transport position (B).

In an embodiment, the steep angle conveyor (55) may be configured to convey the material at angle up-to 90 degree, and the angle at which the crushed material is conveyed from the head section (66) can be varied to avoid spillage of the crushed material.

In an embodiment, the steep angle conveyor (55) configured between the crushing unit (53) and the screening unit (51) is a steep angle side wall conveyor or a pocket conveyor and operates as a primary discharge conveyor.

The crushed material from the crushing unit (53) is transferred to the loading section (72) of the steep angle conveyor (55). The steep angle conveyor (55) is provided with a steep angle conveyor belt (81) that comprises of a plurality of pockets (82) and the head section (66) of the steep angle conveyor (55) is provided with a driving unit (80). The driving unit (80) drives the steep angle conveyor belt (81) by rotating a drive drum [not shown] and thereby the material is transferred from the loading section (72) to the head section (66), by the pockets (82) in the steep angle conveyor belt (81). Thus, the steep angle conveyor (55) conveys the crushed material from the crushing unit (53) to a plain belt transfer conveyor (56).

Figure 3:
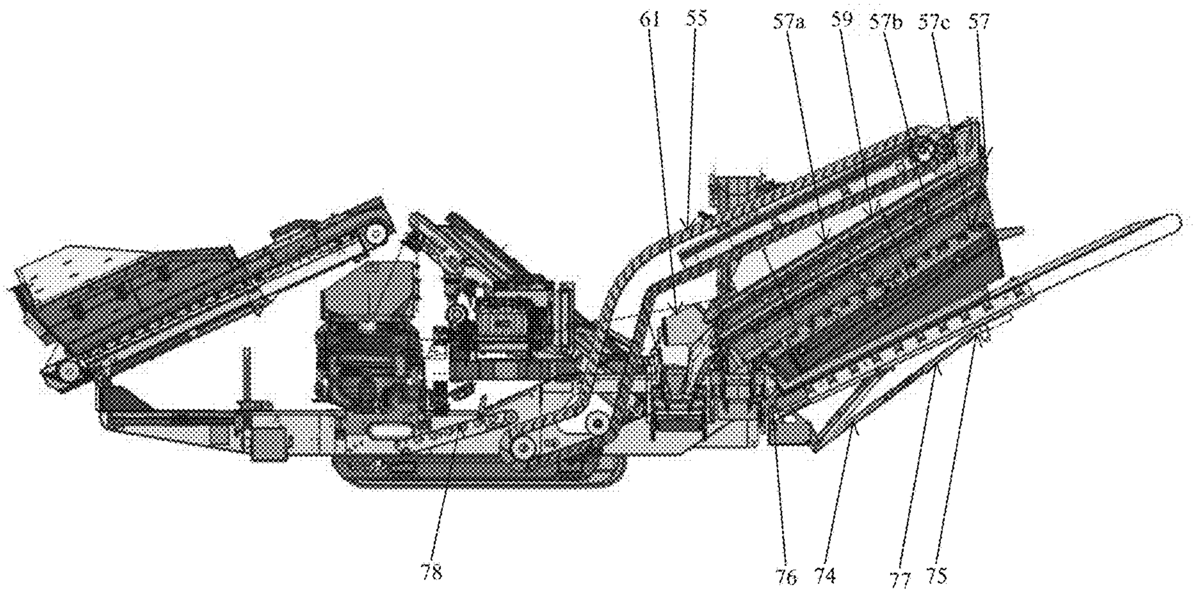
FIG. 3 illustrates a sectional side view of manoueverable crushing and screening system showing the screening unit with three-deck screens.

In an embodiment, the crushed material from the steep angle conveyor (55) may be directly discharged to the screening unit (51) as seen in FIG. 3.

In an embodiment, as seen in FIG. 3, the crushed material from the crushing unit (53) is transferred to the intermediate transfer conveyor (78) and the intermediate transfer conveyor (78) further conveys the material to the loading section (72) of the steep angle conveyor (55).

In an embodiment, the height at which the head section (66) conveys the crushed material to the plain belt transfer conveyor (56) can be varied by means of the articulation unit (C).

In an embodiment, the driving unit (80) that drives the steep angle conveyor belt (81) may be power-driven by an electric motor or by the hydraulic actuators and the power unit (84) housed on the chassis (52).

In an embodiment, the crushing unit (53) and the screening unit (51) may be power-driven by the power unit (84) housed on the chassis (52) or may be driven by an external power source.

FIG. 3 illustrates the side view of the screening unit (51) of the manoueverable crushing and screening system (50). The screening unit (51) may include a plurality of decks. As an example, FIG. 3 shows the screening unit (51) with three-deck screen. The crushed material from the plain belt transfer conveyor (56) is further transferred to the vibrating screen (57). The vibrating screen (57) is of a three-deck screen includes mesh of different sizes/perforations in every deck (59). The three-deck screen includes a first screen deck (57A), a second screen deck (57B) and a third screen deck (57C). The vibrating screen (57) is mounted on a screen sub frame (64) and the vibrating screen (57) is provided with an unbalanced drive (65), for imparting a vibratory motion to the screen (57). The screen sub frame (64) is pivotally connected to the chassis (52) at a first pivot point (67) on the lower end of the vibrating screen (57). The vibrating screen (57) is pivotally moved about the first pivot point (67) from the horizontal transport position (B) to the inclined working position (A) by means of a first hydraulic actuator (68). As seen in FIG. 1, the vibrating screen (57) is supported by a first trestle (69) along with the first hydraulic actuator (68). The first hydraulic actuator (68) is pivotally connected at the point (70) to the screen sub frame (64).

The manoueverable crushing and screening system (50) comprises of a secondary discharge conveyor (71) that is pivotally connected to the chassis (52) at a third pivot point (76) on the lower end of the vibrating screen (57). As seen in FIG. 1, the secondary discharge conveyor (71) is pivotally moved about its third pivot point (76) such that the secondary discharge conveyor (71) is moved from the substantially horizontal transport position (B) to the inclined working position (A) by the second hydraulic actuator (77). The secondary discharge conveyor (71) is supported by a second trestle (74) and the second hydraulic actuator (77) which is pivotally connected at a second pivot point (75) to the secondary discharge conveyor (71) as seen in FIG. 3. Further, as seen from FIG. 6, when the manoueverable crushing and screening system (50) is in a transport condition (B), the secondary discharge conveyor (71) is retracted to a substantially horizontal position. The secondary discharge conveyor (71) lies at the substantially horizontal position up to the fourth pivot point (85) and the secondary discharge conveyor (71), further of the fourth pivot point (85) is pivoted to a substantially vertical position during the transport position (B). As seen from the FIG. 6, the first half of the secondary discharge conveyor (71) lies in the substantially horizontal position and the second half of the secondary discharge conveyor (71) lies at a substantially vertical angle during the transport condition (B).

Figure 4:
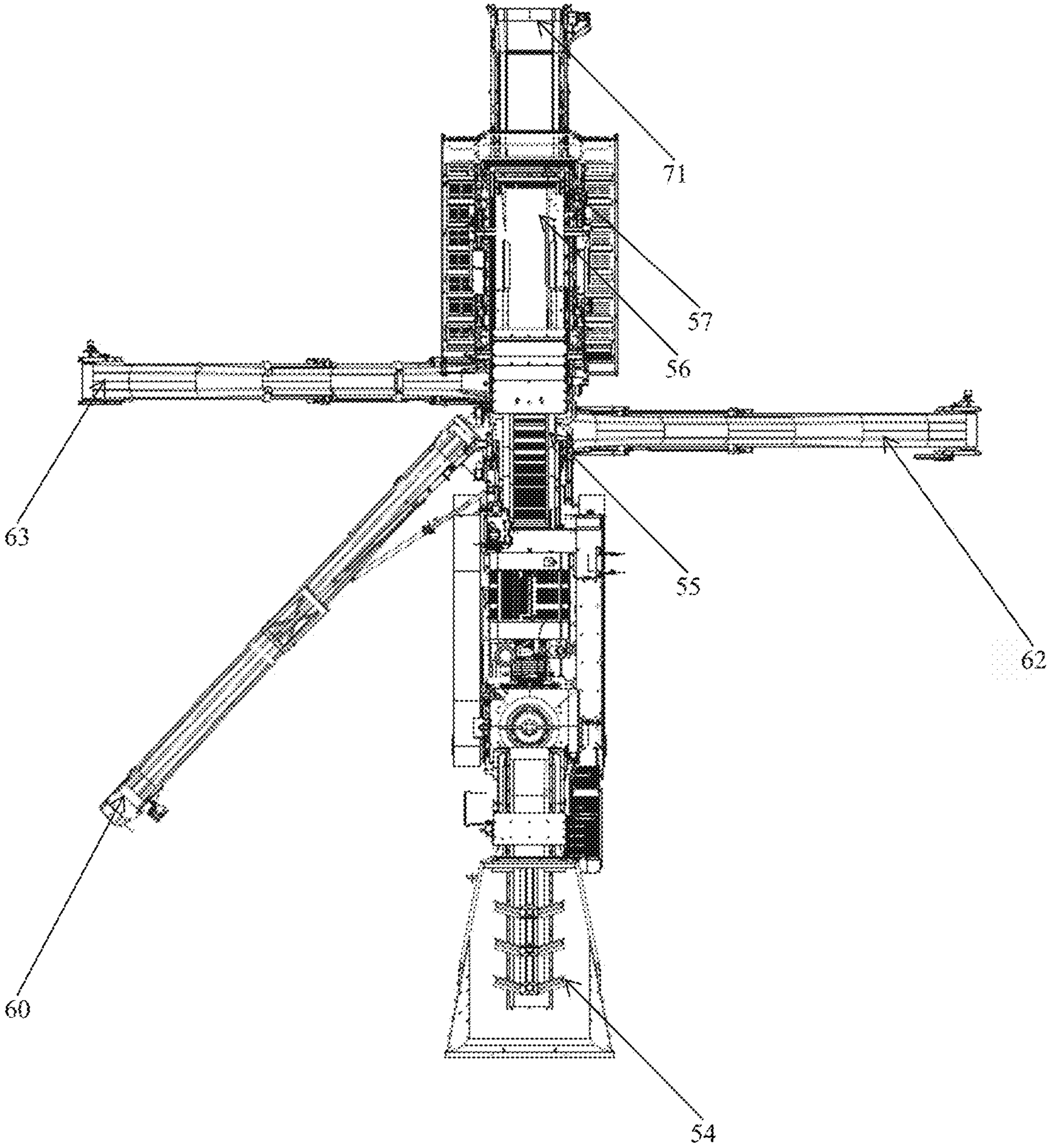
FIG. 4 illustrates a schematic top view of the manoueverable crushing and screening system of FIG. 1 showing plurality secondary conveyors.

FIG. 4 illustrates a plurality of second conveyors (60, 62, 63) of the manoueverable crushing and screening system (50). As seen from FIGS. 3 and 4, the crushed material is fed from the steep angle conveyor (55) onto the upper end of the vibrating screen (57) by the plain belt transfer conveyor (56). The material is further conveyed onto a vibrating screen (57) by the plain belt transfer conveyor (56). The vibrating screen (57) is disposed at an angle to the horizontal plane and the crushed material is passed onto the screen mesh (59).

The oversize particles of crushed material that do not penetrate through the mesh of the first screen deck (57A), remain on the first screen deck (57A). These oversize particles travel downwards on the first screen deck (57A) until they are discharged onto a chute (61). The chute (61) communicates with the secondary conveyor (60) for the separation of the oversize particle. These oversize particles that do not pass through the mesh of the first screen deck (57A) are defined as first end product.

The mid over size particles of crushed material that penetrate through the mesh of the first screen deck (57A) but are oversized to penetrate through the mesh of the second screen deck (57B) are retained on the second screen deck (57B). These particles continue to travel down the second screen deck (57B) until they are discharged onto the secondary conveyor (62). The mid over size particles are separated as second end products by the vibrating screen (57) and are discharged for stock piling by the secondary conveyor (62) which is disposed at an outlet of the second screen deck (57B).

Further, the mid fine particles that do not pass through the mesh of the third screen deck (57C) but pass through the mesh of the second screen deck (57B), continue to travel downwards on the third screen deck (57C) until they are discharged onto the secondary conveyor (63). The mid fine size particles are separated as third end products by the vibrating screen (57) and are discharged for stock piling by the secondary conveyor (63), as seen from the FIG. 4.

The fine particles of the crushed material that are smaller than the openings in the screen mesh (59) on the third screen deck (57C), drop through the third screen deck (57C) on to the secondary discharge conveyor (71). These particles that pass through the third screen deck (57C) of the vibrating screen (57) are defined as fourth end product or as under size particles. As seen from FIG. 4, the fine particles from the secondary discharge conveyor (71) are discharged for stock piling.

In an embodiment, the oversize particles of crushed material are further recirculated to the crushing unit (53) for re-processing.

Figure 5:
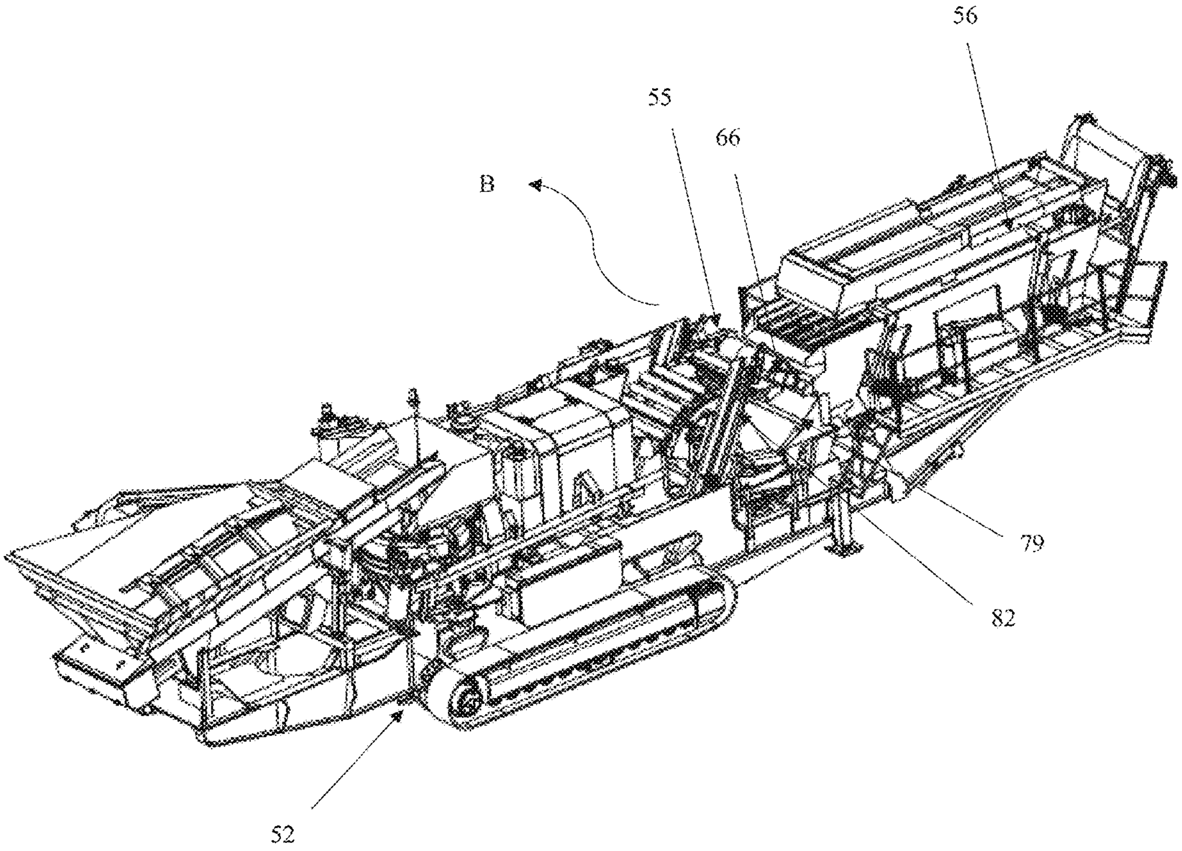
FIG. 5 illustrates the perspective views of the manoueverable crushing and screening system with the steep angle conveyor in the second position, in accordance with an embodiment of the disclosure.
Figure 6:
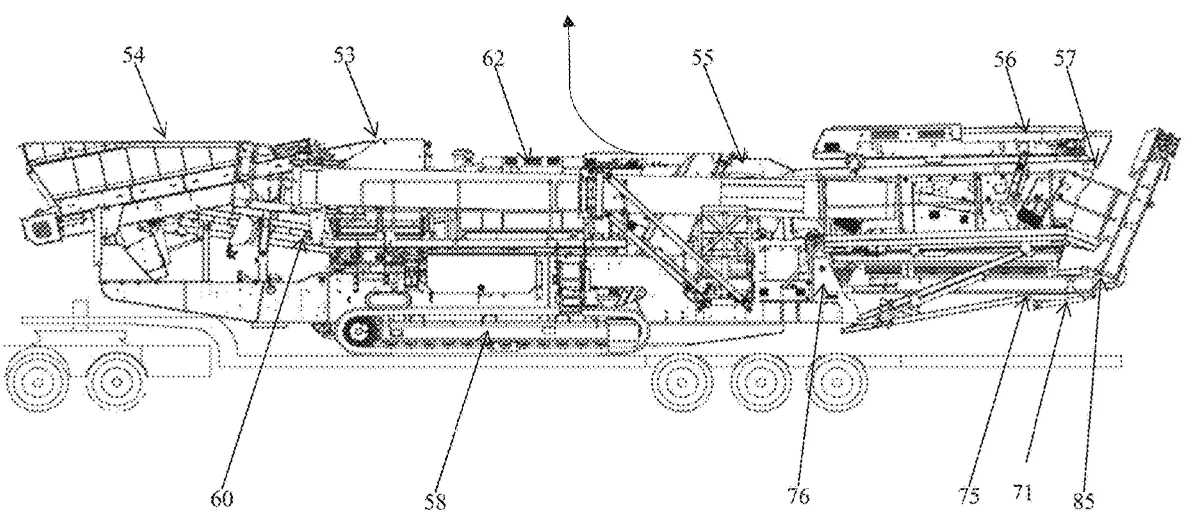
FIG. 6 illustrates the manoueverable crushing and screening system of FIG. 1, being transported on a trailer of a truck.

FIGS. 5 and 6 illustrates the perspective view of the manoueverable crushing and screening system (50) with the steep angle conveyor (55) in the resting/transport position (B). As seen in FIGS. 5 and 6, the head section (66) of the steep angle conveyor (55) is retracted by the articulation unit (C). The actuator (83) and the rails (79) of the articulation unit (C), retract the head section (66), such that the head section (66) lies at the same level as that of the crushing unit (53). The vibrating screen (57) and the secondary discharge conveyor (71) that are pivotally moved about the first and the second pivot point (67 and 75) are also retracted from their working position (A) to the transport position (B) by the first and the second hydraulic actuators (68 and 77) respectively. Thus in the transport position (B), the screening unit (51) and the steep angle conveyor (55) are retracted to lie at the same level as that of the crushing unit (53), thereby providing a compact and an easier means for the transportation of the manoueverable crushing and screening system (50). As seen in FIG. 6, the manoueverable crushing and screening system (50) may be brought on board a trailer of a truck and thereby transport the manoueverable crushing and screening system (50) in a faster manner.

ADVANTAGES

In an embodiment of the present disclosure, use of the steep angle conveyor (55) for discharging the crushed material, onto the screening unit (51) provides a maximum space utilization in the manoueverable crushing and screening system (50) and therefore the operating length of equipment is optimized.

In an embodiment of the present disclosure, since the transport height of steep angle conveyor (55) can be reduced during transport position (B), the manoueverable crushing and screening system (50) can be moved around at less height which is beneficial for shipping the machine from place to place.

In an embodiment of the present disclosure, the manoueverable crushing and screening system (50) can segregate the crushed particles into four different sizes since the space saved by using the steep angle conveyor (55) on manoueverable crushing and screening system (50) is used to provide a plurality of screen decks.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated in the description.

Referral Numerals:

| Description | Referral Numeral |
|---|---|
| Manoueverable crushing and screening system | 50 |
| Screening unit | 51 |
| Chassis | 52 |
| Crushing unit | 53 |
| Hopper and feed conveyor | 54 |
| Steep angle conveyor | 55 |
| Plain belt transfer conveyor | 56 |
| Vibrating screen | 57 |
| First screen deck | 57A |
| Second screen deck | 57B |
| Third screen deck | 57C |
| Tracked under carriage | 58 |
| Screen mesh | 59 |
| Secondary conveyor | 60, 62, 63 |
| Chute | 61 |
| Screen sub frame | 64 |
| Unbalanced drive | 65 |
| Head section | 66 |
| First pivot point | 67 |
| First hydraulic actuator | 68 |
| First Trestle | 69 |
| Point through which actuator is connected to the sub frame. | 70 |
| Secondary discharge conveyor | 71 |
| Loading Section | 72 |
| Inclined section | 73 |
| Second Trestle | 74 |
| Second pivot point | 75 |
| Third pivot point | 76 |
| Second hydraulic actuator | 77 |
| Intermediate transfer conveyor | 78 |
| Rails | 79 |
| Driving unit | 80 |
| Steep angle Conveyor belt | 81 |
| Pockets | 82 |
| Actuator | 83 |
| Power unit | 84 |
| Fourth pivot point | 85 |
| First/working position | A |
| Second/transport position | B |
| Articulation unit | C |

We claim:

1. A manoueverable crushing and screening system, the system comprising:

a chassis with a manoueverable undercarriage;

a crushing unit mounted at one end of the chassis; a screening unit mounted on the other end of the chassis;

a steep angle conveyor configured between the crushing unit and the screening unit, wherein the steep angle conveyor is operable between a working position (W) and a resting position (R), wherein the steep angle conveyor further comprises:

a loading section fixed to the chassis;

an articulation unit (C);

a head section mounted on the articulation unit (C) supported by the chassis; and a steep angle conveyor belt extending between the loading section and the head section, wherein the steep angle conveyor belt includes a plurality of pockets for conveying the crushed material, wherein, at the working position (W), the steep angle conveyor is configured to convey crushed material from the crushing unit to the screening unit, and at the resting position (B), the steep angle conveyor is lowered and supported at a substantially same level as that of the crushing unit; and wherein one end of the articulation unit (C) is positioned on the chassis (52) adjacent to the crushing unit (53) and an opposite end of the articulation unit (C) is positioned adjacent to the screening unit (51), the articulation unit (C) further compromises:

an actuator coupled to the head section, configured to operate the steep angle conveyor between the working position and the resting position; and a guide channel defined in the chassis to support and a guide the movement of the head section between the working position (W) and the resting position (R).

2. The system as claimed in claim 1, wherein the manoueverable undercarriage is at least one of a tracked under carriage or a wheeled undercarriage.

3. The system as claimed in claim 1, wherein the steep angle conveyor is a pocket conveyor.

4. The system as claimed in claim 1, wherein the head section of the steep angle conveyor comprises of a driving unit configured to drive the steep angle conveyor belt by rotating a drive drum.

5. The system as claimed in claim 1, wherein the screening unit comprises a plurality of decks to segregate the crushed material.

6. The system as claimed in claim 5, comprises a plurality of secondary conveyors, each of the plurality of secondary conveyors is coupled to an outlet of at least one of the plurality of decks.

* * * * *